US008940209B2

(12) United States Patent
Dris et al.

(10) Patent No.: US 8,940,209 B2

(45) Date of Patent: Jan. 27, 2015

(54) POLYETHERIMIDE POLYMER FOR USE AS A HIGH HEAT FIBER MATERIAL

(75) Inventors: Irene Dris, Clifton Park, NY (US); Ann Marie Lak, Ludlow, MA (US); Craig Wojcicki, Pittsfield, MA (US)

(73) Assignee: Sabic Global Technologies B.V. (NL)

( * ) Notice: Subject to any disclaimer, the term of this patent is extended or adjusted under 35 U.S.C. 154(b) by 190 days.

(21) Appl. No.: 12/611,447

(22) Filed: Nov. 3, 2009

(65) Prior Publication Data

US 2010/0048853 A1 Feb. 25, 2010

Related U.S. Application Data

(62) Division of application No. 11/456,401, filed on Jul. 10, 2006, now abandoned.

(51) Int. Cl.

*D01D 1/10* (2006.01)
*D01F 6/74* (2006.01)
*D01D 5/088* (2006.01)

(52) U.S. Cl.

CPC *D01F 6/74* (2013.01); *D01D 5/088* (2013.01); *D01D 1/106* (2013.01)

USPC ..................................... 264/169; 264/211.14

(58) Field of Classification Search

USPC ............................................ 264/169, 211.14

See application file for complete search history.

(56) References Cited

U.S. PATENT DOCUMENTS 3,135,811 A 6/1964 Barnett et al.
3,570,059 A 3/1971 Mott
3,802,821 A 4/1974 Mott
3,803,085 A 4/1974 Takehoshi et al.
3,847,867 A 11/1974 Heath et al.
3,850,885 A 11/1974 Takekoshi et al.
3,852,242 A 12/1974 White
3,855,178 A 12/1974 White et al.
3,871,946 A 3/1975 Romanski et al.
3,905,942 A 9/1975 Takekoshi et al.
3,969,462 A 7/1976 Stofan
3,972,902 A 8/1976 Heath et al.
3,983,093 A 9/1976 Williams, III et al.
4,159,618 A 7/1979 Sokaris
4,443,591 A 4/1984 Schmidt et al.
4,455,410 A 6/1984 Giles, Jr.
4,485,140 A 11/1984 Gannett et al.
4,640,972 A 2/1987 Irwin
4,650,850 A 3/1987 Howson
4,725,642 A 2/1988 Gannett et al.
4,794,157 A 12/1988 Berdahl et al.
4,816,527 A 3/1989 Rock
4,820,781 A 4/1989 Policastro et al.
4,847,311 A 7/1989 Yamaya et al.
4,855,391 A 8/1989 Berdahl et al.
4,931,540 A 6/1990 Mueller et al.
4,943,220 A 7/1990 Fourne
4,943,481 A 7/1990 Schilo et al.
4,973,651 A 11/1990 Vora
4,994,544 A 2/1991 Nagahiro et al.
5,013,817 A 5/1991 Ohta et al.
5,043,419 A 8/1991 Ohta et al.
5,061,784 A 10/1991 Mueller et al.
5,131,827 A 7/1992 Tasaka
5,150,476 A 9/1992 Statham et al.
5,175,367 A 12/1992 Feiring
5,206,339 A 4/1993 Saruwatari et al.
5,223,556 A 6/1993 Gotoh et al.
5,229,184 A 7/1993 Campbell et al.
5,229,482 A 7/1993 Brunelle
5,260,121 A 11/1993 Gardner et al.
5,355,567 A 10/1994 Holliday
5,391,419 A 2/1995 Davenport
5,413,852 A 5/1995 Chung et al.
5,447,540 A 9/1995 Kobayashi et al.
5,457,154 A 10/1995 Ohta et al.
5,490,931 A 2/1996 Chung et al.
5,525,410 A 6/1996 Hansen
5,573,813 A 11/1996 Custer et al.
5,668,594 A 9/1997 Cahill, III (Continued)

FOREIGN PATENT DOCUMENTS

EP 0053927 A1 6/1982
EP 0102536 A2 3/1984

(Continued)

OTHER PUBLICATIONS

EP0291801 A2; Abstract; Nov. 23, 1988; 1 Page.
JP1306614; Abstract; Publication Date Dec. 11, 1989; 8 pages.
JP5154892 A; Abstract; Publication Date Jun. 22, 1993; 6 pages.
Avora FR Technical Bulletin, Aug. 2005, Invista Specialty Products, 11 pages.
German Application No. 195 14 866 A1; Filing Date: Apr. 22, 1995; English Translation; 8 pages.
De Laney, et al, “Melt Filtration, An Introduction” from “The Extrusion Technicians Toolbox”; Published by the Society of Plastics Engineers, Jun. 2004, 14 pages.
German Patent DE2829811; English Translation with Certification; Published Jan. 24, 1980; 59 pages.
Derwent XP002463686 Abstract; Jan. 28, 2008; 1 page.

(Continued)

*Primary Examiner* — Leo B Tentoni

(74) *Attorney, Agent, or Firm* — Cantor Colburn LLP; Diderico van Eyl

(57) ABSTRACT

Various embodiments of polymer fibers comprising a high heat polymer and process for making the polymer fibers are provided. In one embodiment, synthetic polymer fibers comprise polyetherimide polymer that is substantially free of foreign particulate matter greater than about 100 microns in size. A process for producing polymer fiber includes melting polymer comprising polyetherimide to a melt temperature that ranges from about 180-500° C. to form a molten polymer; passing the polyetherimide that is substantially free of foreign particulate matter above about 100 microns in size, through a spinneret comprising a plurality of hole openings to produce a fiber bundle; and cooling the fiber bundle with a cooling medium having a temperature that ranges from about 0° C. to about 80° C.

19 Claims, No Drawings

(56) References Cited

U.S. PATENT DOCUMENTS

| | | | | |
|---|---|---|---|---|
| 5,670,256 | A | 9/1997 | St. Clair et al. | |
| 5,688,594 | A | 11/1997 | Lichscheidt et al. | |
| 5,694,981 | A | 12/1997 | Stanhope et al. | |
| 5,727,401 | A | 3/1998 | Statham | |
| 5,788,993 | A | 8/1998 | Bryner et al. | |
| 5,840,828 | A | 11/1998 | St. Clair et al. | |
| 5,928,971 | A | 7/1999 | Ellis et al. | |
| 6,132,476 | A | 10/2000 | Lunsford et al. | |
| 6,159,249 | A | 12/2000 | Murakami et al. | |
| 6,174,474 | B1 | 1/2001 | Stein et al. | |
| 6,235,662 | B1 | 5/2001 | Zehnder | |
| 6,284,864 | B1 | 9/2001 | Roderiguez et al. | |
| 6,635,347 | B1 | 10/2003 | Yoshida | |
| 6,899,836 | B2 | 5/2005 | Samant et al. | |
| 7,005,410 | B2 | 2/2006 | Trinh et al. | |
| 7,179,412 | B1 | 2/2007 | Wilkie et al. | |
| 7,244,813 | B2 | 7/2007 | Dong et al. | |
| 7,279,440 | B2 | 10/2007 | Berrigan et al. | |
| 7,314,907 | B2 | 1/2008 | Dong et al. | |
| 7,354,990 | B2 | 4/2008 | Hossan et al. | |
| 7,411,014 | B2 | 8/2008 | Gallucci et al. | |
| 7,585,935 | B2 | 9/2009 | Hossan et al. | |
| 2001/0033037 | A1 | 10/2001 | Nitschke et al. | |
| 2003/0052432 | A1 * | 3/2003 | Osaka et al. | 264/211.14 X |
| 2003/0216099 | A1 * | 11/2003 | Berrigan et al. | 442/409 |
| 2003/0228812 | A1 | 12/2003 | Stanhope et al. | |
| 2004/0052883 | A1 * | 3/2004 | McConnell | 264/211.14 X |
| 2004/0260055 | A1 * | 12/2004 | Gallucci et al. | 528/353 |
| 2005/0049394 | A1 | 3/2005 | Dong et al. | |
| 2005/0064129 | A1 * | 3/2005 | Dong et al. | 264/169 X |
| 2006/0084741 | A1 | 4/2006 | Blackburn et al. | |
| 2006/0194070 | A1 | 8/2006 | Croll et al. | |
| 2006/0226573 | A1 | 10/2006 | Stundl et al. | |
| 2007/0224422 | A1 * | 9/2007 | Fakhreddine et al. | 428/375 |
| 2008/0006970 | A1 | 1/2008 | Dris et al. | |
| 2008/0012170 | A1 | 1/2008 | Lak et al. | |

FOREIGN PATENT DOCUMENTS

| | | | |
|---|---|---|---|
| EP | 0160354 | A2 | 6/1985 |
| EP | 0736057 | B1 | 10/1997 |
| JP | 08296109 | A * | 11/1996 |
| WO | 9213119 | A1 | 8/1992 |
| WO | 2005021648 | A1 | 3/2005 |
| WO | 2007111890 | A3 | 10/2007 |

OTHER PUBLICATIONS

International Standard ISO 105-B02; prepared by Technical Committe ISO/TC 38, Textiles, Subcommittee SC 1, Test for coloured textiles and colorants; Part B02: Colour fastness to artificial light: Xenon arc fading lamp test; Fourth edition Sep. 15, 1994; 12 pages.

ISO 105-B02: 1994(e), Annex A (Normative); Apparatus for determing colour fastness with air-cooled xenon arc lamps; Fourth Edition Sep. 15, 1994, 2 pages.

ISO 105-B02: 1994(E), Annex B (Normative); Apparatus for determining colour fastness with water-cooled xeon arc lamps; Fourth Edition Sep. 15, 1994, 2 pages.

ISO 105-B02: 1994(E), Annex C (Informative); Genral information on colour fastness to light; Fourth Edition Sep. 15, 1994, 2 pages.

International Search Report for International Application No. PCT/US2007/071575; mailed Feb. 4, 2008; 7 pages.

Written Opinion for International Search Report for International Application No. PCT/US2007/071575, mailed Feb. 4, 2008, 7 pages.

Albrecht et al.; "Preparation of Highly Asymmetric Hollow Fiber Membranes from Poly (ether imide) by a Modified Dry-wet Phase Inversion Technique Using a Triple Spinneret; " Journal of Membrane Science 262 (2005); pp. 69-80; Elsevier Scientific Publishing Company.

Bohringer et al.; "New Filaments and Fibres of Polyetherimide"; Makromol Chem., Makromol. Symp. 50; pp. 31-39 (1991); Huthig and Wepf Verlag, Basel.

* cited by examiner

POLYETHERIMIDE POLYMER FOR USE AS A HIGH HEAT FIBER MATERIAL

CROSS-REFERENCE TO RELATED APPLICATIONS

This application is a divisional application of U.S. patent application Ser. No. 11/456,401 filed on Jul. 10, 2006, now abandoned, and which is incorporated by reference herein in its entirety.

FIELD OF THE INVENTION

The present invention relates to high heat fiber and a process for making the fibers. More specifically, the present invention relates to fiber spun from a polymer comprising polyetherimide and having a melt temperature that ranges from about 180° C. to 500° C.

BACKGROUND OF THE INVENTION

Up until the nineteenth century, there was little commercial manufacture of artificial fibers because, with the exception of a crude form of artificial silk, synthetic polymers were largely undiscovered. Fabric was limited to natural fibers like cotton, wool and linen. With the discovery and development of polymers in the early twentieth century, manufactured fibers began to enter the market place in a commercially significant way for the first time. The development of the various fiber manufacturing techniques for polymers, like solvent and extrusion spinning, has taken place in the last fifty years and has developed substantially in that time. Even materials which are difficult to manufacture and make into fiber, such as polyaramids, are now produced on a commercial level to satisfy a global demand. Despite these developments, it is not possible to accurately predict whether a new polymer will make a viable commercial fiber or what type of processing a particular polymer will have to undergo in order to a produce a fiber commercially.

Although there are numerous methods of manufacturing synthetic fiber such as electrospinning, melt spinning, dry spinning and wet spinning, for example, each of these methods of manufacture requires substantively different equipment, different processing conditions and different manufacturing concerns. The three principle methods of producing fiber are melt, dry and wet spinning. All three involve the formation of continuous filament strands by forcing a synthetic material through a circular die. However, melt spinning involves cooling of the subsequent strand to form the solid filament, whereas dry and wet spinning involve the removal of a solvent to form a solid filament. In dry spinning, the solvent evaporates into a gas and in wet spinning the solvent is leached into a liquid bath. It is difficult, if not impossible, to predict which of the various fiber manufacturing processes will produce a commercial fiber, and significantly depends upon the properties of the individual synthetic polymer material to be used to make fiber, i.e., its Tg, melt viscosity, melt index, etc. Each material must be evaluated on its own properties with no predictable guarantee of commercial manufacturing properties.

High melting temperature polymers, such as polyimide polymers having a glass transition temperature that ranges from about 180° C. to about 450° C. have found utility in a variety of applications because of their currently extreme physical properties in addition to their heat resistant properties. For example, Polyetherimides, available from General Electric Company under the ULTEM trademark have high glass transition temperatures, are ductile, flame resistant and generate low amounts of smoke while still having good chemical resistively. These polymers have found wide use in shaped articles, sheet materials, and coatings for use in challenging physical environments such as aerospace applications.

Despite potential use of high heat temperature polymer as fibers and many attempts to produce a polyetherimide fiber, a commercial fiber is not known to have been successfully marketed. U.S. Pat. No. 4,943,481 (1990) to Schilo et al., states at Column 1, lines 7-33:

> Heretofore, the synthesis of polyether imide fibers (even of polyimide fibers) by melt spinning, otherwise normal for the production of polymer fibers, was thought unfeasible (cf, for example, "P84—A new synthetic fiber", Weinrotter, Giesser, published in "Man Made Fiber Yearbook" (1986), 16, page 2408). Polyether imide—but only mixed with other polymers—has only been used for the extrusion of a film (European Patent No. A 160,354).
>
> West German Laid-open Application No. 2,829,811 discloses synthesizing polyether imide fibers by spinning solutions of polyamide acids in an aprotic organic solvent in a spinning bath, after which the freshly spun fibers must be stretched and heat treated to obtain usable textile data.
>
> Polyether imide shapes are also known that are made by injection molding, e.g., spectacle frames, as described in West German Laid-open Application No. 3,429,074. The polyether imide used therein is Ultem® 1000 of General Electric Co. The injection moldability of Ultem 1000 is also mentioned in the Germanlanguage product brochure, "Technische Thermoplaste" (Industrial Thermoplastics), brochure also points out that Ultem® fibers are suitable for making textile fabrics, but no further details are given as to how Ultem® fibers can be synthesized.

Since the 1990 publication of the '481 patent research on the manufacture of fibers from polyetherimide has continued because despite their high processing temperatures, polyetherimides also have high viscosity at low shear rates such that this class of polymer is a potential candidate for testing for use in commercial fibers. U.S. Pat. No. 5,670,256 to St. Clair et al., discloses polyetherimide fibers made from the reaction product of the monomers 3,4'-ODA and ODPA that is melt extruded in the temperature range of 340° C. and 360° C. to lengths (heights) of 100.5 inches, 209 inches and 364.5 inches. U.S. Pat. No. 5,840,828, to St. Clair et al., discloses a method for making polyimide, and specifically, polyetherimide fibers. Nevertheless, there is no currently known marketed polyetherimide fiber available by any company.

In a conventional system for making polymer fiber, polymer resin is extruded in an extruder and passed through a spinneret containing a plurality of hole openings to form a fiber bundle which is cooled, and drawn to a spool or coil. Polyetherimides require higher processing temperatures not generally used for processing other polymeric fibers. These processing conditions often lead to unexpected and difficult processing issues in the commercial manufacture of articles from polyetherimides.

Oftentimes, for example, the flow through spinneret holes become blocked due to contamination that is present in the system. Particles of sintered metal from Mott filters (i.e., so-called Mott filters in accordance with U.S. Pat. Nos. 3,570,059 and 3,802,821) and other debris that may remain from the filter cleaning operation can be dislodged and carried downstream with the polymer flow where they block one or more spinneret holes. These blocked spinneret holes are known colloquially in the art as "slow-holes" since the polymer flow there through is impeded. When slow-holes occur, the entire spinning line must be shut down in order to prevent the production of off-specification product.

It is therefore desirable to minimize or eliminate complications that negatively effect properties of fibers and productivity in manufacturing the fibers. There is a continuing need in the art to develop processes for new materials being used to make fibers.

BRIEF SUMMARY OF THE INVENTION

The present invention provides for a polymer fibers comprising polyetherimide polymer and to processes for making the fiber. In one embodiment, the present invention is directed to a synthetic fiber that includes polyetherimide substantially free of foreign particulate matter above about 100 μm in size.

A process for making polymer fiber includes melting a polymer comprising polyetherimide to form a molten polymer having a melt temperature that ranges from about 180° C. to about 500° C.; passing the polyetherimide which is substantially free of foreign particulate matter above about 100 μm in size through a spinneret comprising a plurality of hole openings to produce a fiber bundle; and cooling the fiber bundle with a cooling medium having a temperature that ranges from about 0° C. to about 80° C. to produce the fiber.

In another embodiment the process for making polymer fiber includes removing foreign particulate matter from the polymer prior to passing the polymer through the spinneret. Accordingly, an alternative process for making polymer fiber includes melting a polymer comprising polyetherimide to form a molten polymer having a melt temperature that ranges from about 180° C. to about 500° C.; removing foreign particulate matter from the polyetherimide to produce polyetherimide polymer substantially free of foreign particulate matter above about 100 μm in size, prior to passing the molten polymer through a spinneret to produce a fiber bundle; and cooling the fiber bundle with a cooling medium having a temperature that ranges from about 0° C. to about 80° C. The foreign particulate matter can be removed from the polymer comprising polyetherimide before or after the polymer is melted.

In yet another embodiment the process for removing foreign particulate matter includes filtering the polyetherimide prior to passing the molten polymer through the spinneret to produce polyetherimide polymer substantially free of foreign particulate matter above about 100 μm in size.

DETAILED DESCRIPTION OF THE INVENTION

According to the present invention the term "Denier" refers to a unit of fineness of silk and some artificial fibers such as nylon equal to one gram per 9,000 meters of yarn.

For purposes of the present invention, the term "polymer" is meant to include oligomers, homopolymers and copolymers.

For purposes of the present invention the term "polyetherimide" refers to a polymer containing monomer units which comprise both a ether and an imide group.

An ether group is well known in the art and consists of an oxygen atom single bonded to two different carbon atoms. An imide group is a nitrogen containing acid having two double bonds.

The term "remove", "removed" and "removing" all refer to the removal of foreign particulate matter from the polymer with which fiber is to be made.

"Filter screen" refers to a woven metal mesh, or gauze, with a specified number of holes per unit area used as a filter. Sintered metal powder or fibers can also be used. The screen mesh may be composed of a square weave or a weave with parallel diagonal lines, sometimes called "Dutch Twill". These screens are generally classified by their mesh number and open area.

"Filter pack" or "screen pack" is a combination of two or more layers of screens or gauze for use in filtering a polymer. For example, a screen pack may be made from an assembly of a 20 mesh, 60 mesh, 100 mesh, 60 mesh and 20-mesh gauzes (designated as 20/60/100/60/20).

"Foreign Particulate Matter" refers to contamination in the extrusion melt stream by extraneous materials (metal, paper, wood, dust, etc.), non-polymeric material which can adversely effect the optimal performance of the fiber and/or the fiber making process according to the present invention. For example, in many high Tg polymers, organic material exposed to the high reaction or processing temperatures, required for making and/or using these polymers can be turned to black specs of carbonized polymer of various sizes. These specs can cause one or more holes in the spinneret to become blocked and cause pressure changes on the inside surface of the spinneret. Such pressure changes adversely affect the speed, volume and quality of fiber. Moreover, if such specs make it through the spinneret, they can become embedded in the fiber, and cause the fiber to have an area of inferior performance, such as a weak spot. Other foreign matter can come from reaction vessels, conduit pipe, shipping packages, unreacted reactants, gels, pre-polymer, process by-products, etc.

The term "rectifier" refers to a device to uniformly diffuse a cooling media around the fiber bundle emerging from the spinneret.

For purposes of the present invention, the term "substantially free of" is intended to mean that a polyetherimide fiber produced in a commercial manufacturing facility is free of enough foreign particulate matter so as not to significantly interfere with the operation of a fiber making line for commercially significant periods of time. In another embodiment, the term "substantially free of" is intended to mean, in a more specific sense, that the fiber product has for example less than about 2% by weight of fiber foreign particulate matter, in another embodiment less than about 1% foreign particulate matter, and in another embodiment less than about 1% foreign particulate matter.

The term "consisting essentially of" is given its ordinary legal definition, with the caveat that the term does not exclude additives, other polymers, dyes, etc. which may be added to the filtered polymer described herein as intended by use of the transition phrase "comprising".

The present invention, according to one embodiment, is directed to a synthetic fiber comprising a polyetherimide polymer that is substantially free of foreign particulate matter above about 100 μm in size.

The fiber according to the present invention may be made exclusively of one polyetherimide or may comprise a blend of two or more polymers including a second polyetherimide. Alternatively, polyetherimide co-polymers may be used to make the fibers of the present invention. Fibers of the present invention can also be manufactured from blends of polyimides and polyetherimides with other polymers. The skilled artisan will appreciate the number of polymers currently marketed and that any polymer can be used in association with the present invention that will meet the end use requirements for the fiber.

Similarly, different polyimides and polyetherimides will have different properties and the skilled artisan will appreciate the desirability of blending one or more of the polyimides and/or polyetherimide polymers with another polymers, for example, crystalline or amorphous polymers, or both, to improve the fiber making process or fiber properties of a polymer fiber according to the present invention. The polymer fibers herein can include polymer compositions comprising from about 1% to about 99% of a polymer or polymers different than polyetherimide, and from about 99% to about 1% polyetherimide polymer, and all ranges therebetween. For example, in one embodiment the polymer fiber comprises at least about 50% polyetherimide, in another embodiment, at least about 75% polyetherimide, in yet another embodiment at least about 95% polyetherimide, and still yet another embodiment at least about 99% polyetherimide.

The present invention is also directed to a process for making the polymer fiber, the process for making polymer fiber includes melting a polymer comprising polyetherimide to form a molten polymer having a melt temperature that ranges from about 180° C. to about 500° C.; passing the molten polymer comprising polyetherimide polymer substantially free of foreign particulate matter above about 100 μm in size through a spinneret comprising a plurality of hole openings to produce a fiber bundle; and cooling the fiber bundle with a cooling medium having a temperature that ranges from about 0° C. to about 80° C., to produce the fiber.

In another embodiment the process for making polymer fiber includes removing foreign particulate matter from the polyetherimide prior to passing the polymer through the spinneret. Accordingly, an alternative process for making polymer fiber includes melting a polymer comprising polyetherimide to form a molten polymer having a melt temperature that ranges from about 180° C. to about 500° C.; removing foreign particulate matter from the polyetherimide to produce a polyetherimide polymer substantially free of foreign particulate matter above about 100 μm in size, prior to passing the molten polymer through a spinneret to produce a fiber bundle; and cooling the fiber bundle with a cooling medium having a temperature that ranges from about 0° C. to about 80° C. The foreign particulate matter can be removed from the polyetherimide before or after the polymer is melted.

The polymer or polyetherimide or both may undergo at least one of several various processes to remove foreign particulate matter of many sizes. The skilled artisan will appreciate that a wide range of methods and apparatus are known in the art and that depending on the size of the particulate matter as well as the end use of the fiber, there will be a variety of different ways of producing a polyimide-containing product that is substantially free of foreign particulate matter. A removal process to remove at least a portion of one or more types of foreign particulate matter to produce a "purified" polymer, where the purified polymer is defined herein as having a reduced concentration of foreign particulate matter.

Known processes for the removing foreign particulate matter from materials include, but are not limited to, for example, a filtration process, an irradiation process, a heating process, a cooling process, a pressurization process, a depressurization process, a chemical addition process, adsorption process, precipitation process, a phase transfer process, and combinations thereof, for at least one of separating, destroying, and converting the foreign particulate matter to remove it. As a specific example of a combined process, the polyetherimide polymer can be dissolved in solvent to form a solution, which is then filtered and then re-solidified to a polymer that is substantially free of foreign particulate matter.

Accordingly the present invention is directed to a polymer fiber comprising polyetherimide that is substantially free of foreign particulate matter greater than about 100 μm in size, in another embodiment greater than about 75 μm in size, in another embodiment, greater than about 50 μm in size, and yet in another embodiment, greater than about 25 μm in size, and in still yet another embodiment, greater than about 10 μm in size.

The thickness of the fiber according to the present invention is preferably between 0.1 and 100,000 dpf (denier per filament), or, in another embodiment, from about 0.1 dpf to about 100 dpf, in another embodiment from about 0.1 dpf to about 50.0 dpf, and in yet another embodiment from about 0.25 dpf to about 10.0 dpf, or still yet further from about 0.25 dpf to about 1.0 dpf. In accordance with an embodiment of the present invention, a polymer fiber may range from about 1 dpf to about 20 dpf, in another embodiment, less than about 10 dpf, for example 2 dpf, 4 dpf, and 6 dpf Depending on the end use of the fiber, other dimensional characteristics may also be employed to describe the fibers according to the present invention. For example, dyed fibers also include those from 0.01 dpf through 50,000 dpf, or for example, 0.1 dpf to about 100 dpf.

The fiber may also be measured characterized in terms of its diameter which can range from about 0.00001 millimeter to about 2 millimeter (mm), for example from about 0.0001 mm to about 0.5 mm, and as another example, from about 0.005 mm to about 0.5 mm, and still yet in another example from about 0.005 mm to about 0.095 mm. The skilled artisan will appreciate that these ranges include different breadths depending on the spinneret hole measurements and the use of the fiber and that the present invention is intended to encompass the entire range of sizes of polyetherimide fiber.

The fiber may be either of a continuous filament shape or a short staple fiber shape (for example, staple yarn sizes can be 2.25/2 and 10/1 English cotton count; which equates to deniers of 4703 and 532 respectively), including those uniform or irregular in thickness in the lengthwise direction, the cross-sectional shape of which may be circular, triangular, polygonal, multi-lobal or indefinite, including an L-shape, a T-shape, a Y-shape, a W-shape, an octagonal lobal shape, a flat shape and a dog-bone shape. The fiber according to the present invention may be either solid or hollow.

The polymer fiber comprising polyetherimide, according to an embodiment of the present invention, is substantially free of foreign particulate matter having a size greater than or equal to about 85% of the diameter of the fiber, in another embodiment greater than or equal to about 50% of the diameter of the fiber, in another embodiment greater than or equal to 25% of the diameter of the fiber, and in yet another embodiment greater than or equal to 10% of the diameter of the fiber.

In one embodiment, the present invention is directed to a polymer fiber comprising a polyetherimide in which the polymer has been filtered to remove foreign particulate matter so that the polymer comprising polyetherimide is substantially free of foreign particulate matter. The polymer can be filtered prior to processing into a fiber to remove any particulate matter that may effect any parameter of commercial scale fiber manufacturing process, including speed, volume and quality of fiber produced. For example, the polymer used in the fiber of the present invention can be filtered prior to passing the molten polymer through the spinneret, and in another embodiment the polymer comprising polyetherimide can be filtered before or after melting the polymer in the production of fiber.

In absolute sizes, particulate matter can be substantially eliminated from the polymer comprising polyimide or polyetherimide used to make the fiber according to the present invention. For example, commercially available polymer filters from, for example, Pall Corporation, of East Hills, N.Y., offer multilayer composites of woven wire mesh and/or fiber metal felt under their "FS Series" designation which can remove foreign particulate matter from polymer, down to a level of 15, 10, 5, 3, 2, and/or 1 μm. Filters available from Purolater Advanced Filtration, a CLARCOR company, of Greensboro, N.C., under the POROPLATE, POROFELT and POROMESH tradenames, can filter foreign particulate matter ranging in size from 3-200 μm. In addition to single filters, "filter packs" can also be used to filter polymer according to the present invention. Another example of a filter that can be used is a sand filter which is commercially available.

The skilled artisan will appreciate the multitude of different ways for filtering the polymers of the present invention to allow for the commercial production of the novel fibers of the present invention. The polymer can be filtered at any time prior to, or during the production of the fibers using a variety of apparatus and techniques known in the art.

A spinning apparatus that can be used in a process for producing fiber according to an embodiment is now described. Molten polymer flows from an extruder, into a metering pump and then flows through a pack top having at least one channel that leads to a filter to remove foreign particulate matter before the material flows through the spinneret having holes, to form a fiber bundle made up of a plurality of individual polymer fibers or filaments. The number of individual fibers in the fiber bundle can depend upon several factors relating to the design of the spinneret, such as, for example the hole pattern, the number of holes and sizes of holes, and the size and geometric shape of the spinneret to accommodate the holes. For example, there may be anywhere from twenty to several thousand holes, for example, in one embodiment from about 20 to about 1000, in another embodiment from about 100 to about 800, in another embodiment from about 150 to about 700, and in another embodiment from about 150 to about 250, in a spinneret, depending on whether a textile filament, industrial filament, or textile staple is being produced.

The fiber bundle is quenched by quench system which includes a cooling medium, for example a gaseous cooling medium, a source that produces the cooling medium, such as for example a motorized fan, and a rectifier through which the cooling medium flows on its path to the fiber bundle. Rectifiers are commonly made from perforated mesh, for example metal or high temperature plastic, or a permeable foam material to provide a uniform velocity distribution directed toward the path of the fiber bundle extruded from the spinneret. The rectifier has a predetermined length, L, that defines the length of the cooling zone area through which the cooling medium is directed. The gaseous cooling medium flows in a direction represented by arrow and shown, for example, in a direction that is transverse to the path of travel of the fiber bundle.

Once passing through the quench system, the fiber bundle is then further processed through a convergence guide and are then drawn by at least one roll, or gobet, and wound on a bobbin or spool. Optionally, the process for producing fiber can include a finishing step in which a finish can be applied via a finish applicator before the fiber bundle reaches the convergence guide.

Filtering the polymer prior to the exit of the polymer from the spinneret or diehead, has the additional advantage of changing the pressure on the polymer (as opposed to fiber) side of spinneret or die head. The pressure on the inside surface of the spinneret can be manipulated to be uniform and constant such that output and quality are maintained for extended periods allowing for long production runs. The pressure on the inside of the spinneret can be maintained at any pressure greater than zero to about 3,000 psi, in another embodiment from about 50 psi to about 1000 psi, in yet another embodiment from about 400 psi to about 800 psi, and in yet another embodiment from about 500 psi to about 600 psi. Depending on the number of holes in the spinneret, this pressure will be distributed among the holes. In another embodiment of the present invention, the pressure will be evenly distributed and the pressure per hole of the spinneret will be approximately 1 psi/hole.

In one embodiment, a process for producing polymer fiber includes extruding molten polymer having a melt temperature that ranges from about 180° C. to about 500° C., in another embodiment from about 180° C. to about 470° C., in another embodiment from about 200° C. to about 450° C.°, and in yet another embodiment from about 300° C. to about 425° C.

The melt index of the polymer comprising polyetherimide can range from about 1 to about 3, or in another embodiment, from about 1.5 to about 2.5, and in yet another embodiment, from about 1.8 to about 2.2. The melt index range will depend on the composition of the polymer comprising polyetherimide and should not be too low as to be too viscous for uniformly passing through the holes of the spinneret, and should not be to high so as to lose melt strength or compromise the physical properties of the fiber produced, a as can be determined by one of ordinary skill in the art.

Typical drying conditions for drying the polymer having a melt temperature that ranges between 180° C. and 500° C. are well within the knowledge of the skilled artisan. For example, polyetherimide polymer is dried by heating the polyerm to about 300° C. for about four to twelve hours. Drying may be achieved at an extruder before it enters the extruder barrel to be melted.

The size of the holes in the spinneret are directly related to the size of the fiber exiting from the spinneret. The spinneret can have a variety of number of holes depending on the volume, denier, commercial requirement or end properties of the fiber to be produced. For example, the spinneret can have from 1 (to produce very thick, i.e. 2.00 mm fibers) to 3000 holes, or in another embodiment from 32 to 1000 holes. In yet another embodiment, the number of holes can range from 64 to 850, alternatively from 100-700, and for example from 120-150.

The spinneret holes can be of any diameter that will produce a desired denier fiber. Diameters can range from 0.001 mm up to 3 cm, or range from 0.1 mm up to 1 cm, or more specifically can range from 0.3 mm up to 5 mm. In many circumstances, the diameter of the spinneret hole will be directly related to the denier of the fiber to be produced. For example, a spinneret hole diameter of from 0.45 mm to 0.6 mm will produce a fiber from about 2 to about 4 denier using ULTEM 9011, a commercially available PEI from GE Plastics, Pittsfield, Mass., USA.

The fiber bundle exiting the spinneret can be cooled with a cooling medium having a temperature that ranges from about 0° C. to about 80° C. to produce fibers depending on the particular composition of polymer comprising polyetherimide. In another embodiment, the cooling media has a temperature that ranges from about 0° C. to about 40° C., and in yet another embodiment, the cooling media has a temperature that ranges from about 10° C. to about 24° C. The cooling media can be a liquid, for example water, or a gas, for example air. The cooling media can be directed toward the fiber bundle as it emerges from the spinneret, and can have at a substantially uniform velocity distribution. For example the gaseous cooling media directed toward the fiber bundle ranges from abut 0.01 to about 10 meters per second. Velocities which are too high can cause fibers to break.

Productivity output rates of fiber from at least about 100 meters/minute up to and including 7500 meters/minute can be achieved. In another embodiment, the output rates can range from about 100 meters/minute to about 5,000 meters/minute, in another embodiment from about 500 meters/minute to about 5,000 meters/minute. In still yet another embodiment, the output rates of fiber can range from about 750 meters/minute up to and including about 4000 meters/minute.

The polymer fibers comprising polyetherimide described herein have a tenacity of at least about 0.5 g/denier, in another embodiment from about 0.5 g/denier to about 50 g/denier, in yet another embodiment from about 1 g/denier to about 7 g/denier, and in still yet another embodiment from about 1 g/denier to about 3.5 g/denier, as tested according to ASTM-02256-97. The polymer fibers comprising polyetherimide described herein have an elongation at break of at least about 10%, in another embodiment from about 10% to about 50%, in yet another embodiment from about 10% to about 30%, and in still yet another embodiment at least about 30%, as tested according to ASTM-02256-97. The measured elongation varies as a function of the draw ratio of the rollers, where a relatively higher draw ratio results in a relatively lower elongation.

Any final fiber produced according to the claimed invention, may be included in a multifilament yarn including, in addition to, one or more fibers comprising a polyetherimide, other synthetic, organic, inorganic or natural fibers. Other fibers which may be blended with one or more polyetherimide fibers are selected from synthetic fibers selected from the group consisting of nylons, acrylic, modacrylic, PBI, polyesters, polypropylene, polyethylene, latex, PET, PI, polyesters, spandex, sulfar, vivyon, NOMEX, carbon, aramid, ceramic, metal, glass, etc., and mixtures thereof. Natural fibers including but not limited to cellulosic fibers, e.g., cotton, rayon, linen, poly/cotton blends, Tencel, and mixtures thereof, proteinaceous fibers, e.g., silk, wool, related mammalian fibers, and mixtures thereof, long vegetable fibers, e.g., jute, flax, ramie, coir, kapok, sisal, henequen, abaca, hemp, sunn, and mixtures thereof, and natural material in the form or fibers including asbestos, for example.

The fiber may be converted to a yarn form according to any method known in the art, such as a spun yarn manufactured from a ring spinning frame or an open end spinning frame, a filament yarn having a single fiber thickness in a range from 0.001 inch to 0.35 inch (including an ultra-fine, yarn), a soft or hard twisted yarn, a mixed fiber yarn, a false-twist textured yarn (including a draw-false twist textured yarn of POY) or an air jet textured yarn. In this regard, the mixed fiber yarns according to the present invention may be made through such well known processes as fiber-mixing means, such as a mixed-spinning process (including a ciro-spun or a ciro-fil), an entanglement mixing process (wherein yarns having various shrinkages are mixed together), a mixed-twisting process, a composite false-twist process (including an elongation-difference-false-twist process) or a two-feed air jet texturing process.

As stated above, the fiber according to the present invention comprises one or more polyetherimides. Thermoplastic polyimides have the general formula (1):

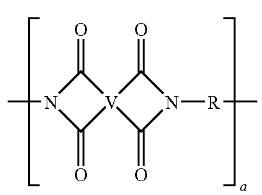

(1)

wherein a is more than 1, typically about 10 to about 1,000 or more, or more specifically about 10 to about 500; and wherein V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations comprising at least one of the foregoing. Suitable substitutions and/or linkers include, but are not limited to, ethers, epoxides, amides, esters, and combinations comprising at least one of the foregoing. At least a portion of the linkers V contain a portion derived from a bisphenol. Desirably linkers include but are not limited to tetravalent aromatic radicals of structures (2)

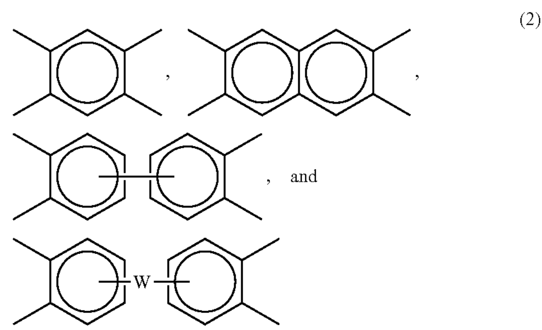

(2)

wherein W is a divalent moiety including —O—, —S—, —C(O)—, —$SO_2$—, —SO—, —$C_yH_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formulas 3.

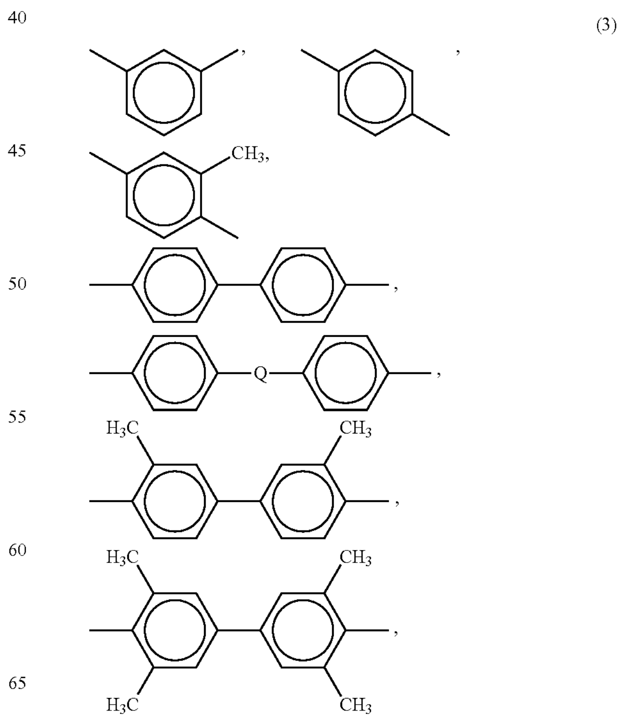

(3)

-continued

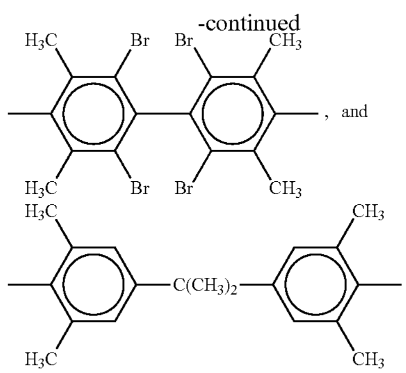

wherein Q includes but is not limited to a divalent moiety including —O—, —S—, —C(O)—, —$SO_2$—, —SO—, —$C_yH_{2y}$— (y being an integer from 1 to 5), and halogenated derivatives thereof, including perfluoroalkylene groups.

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (4)

(4)

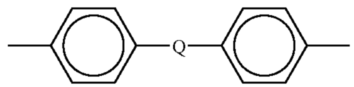

wherein Q includes but is not limited to a divalent moiety including —O—, —S—, —C(O)—, —$SO_2$—, —SO—, —$C_yH_{2y}$— (y being an integer from 1 to 5), and halogenated derivatives thereof, including perfluoroalkylene groups.

Exemplary classes of polyimides include polyamidimides and polyetherimides, particularly those polyetherimides which are melt processible, such as those whose preparation and properties are described in U.S. Pat. Nos. 3,803,085 and 3,905,942.

Exemplary polyetherimide resins comprise more than 1, typically about 10 to about 1,000, or more specifically, about 10 to about 500 structural units, of the formula (5)

(5)

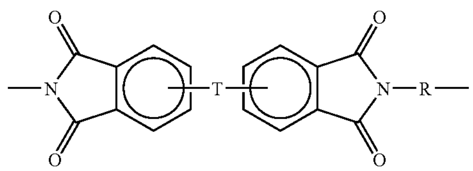

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula 10 as defined above.

In one embodiment, the polyetherimide may be a copolymer which, in addition to the etherimide units described above, further contains polyimide structural units of the formula (6)

(6)

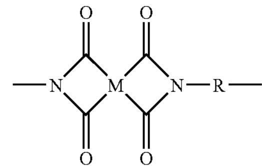

wherein R is as previously defined for formula (I) and M includes, but is not limited to, radicals of formulas (7).

(7)

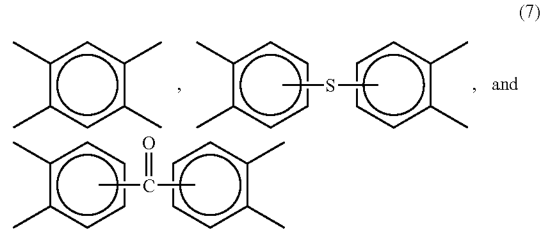

The polyetherimide can be prepared by various methods, including, but not limited to, the reaction of an aromatic bis(ether anhydride) of the formula (8)

(8)

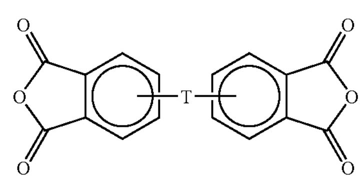

with an organic diamine of the formula (9)

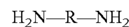

$H_2N—R—NH_2$ (9)

wherein R and T are defined in relation to formulas (1) and (5).

Examples of specific aromatic bis(ether anhydride)s and organic diamines are disclosed, for example, in U.S. Pat. Nos. 3,972,902 and 4,455,410. Illustrative examples of dianhydrides, including aromatic bis(ether anhydride)s of formula (8) include:

2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyl ether dianhydride;

4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy) diphenyl sulfone dianhydride;
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride;
cyclobutane tetracarboxylic dianhydride;
cyclopentane tetracarboxylic dianhydride;
cyclohexane-1,2,5,6-tetracarboxylic dianhydride;
2,3,5-tricarboxycyclopentylacetic dianhydride;
5-(2,5-dioxotetrahydrofural)-3-methyl-3-cyclohexene-1,2-dicarboxylic dianhydride;
1,3,3a,5-dioxo-3-furanyl)-naphtho[1,2,-c]-furan-1,3-dione;
3,5,6-tricarboxynorbornane-2-acetic dianhydride;
2,3,4,5-tetrahydrofuran tetracarboxylic dianhydride;
3,3',4,4'-diphenyl tetracarboxylic dianhydride;
3,3',4,4'-benzophenonetetracarboxylic dianhydride; naphthalic dianhydrides such as (2,3,6,7-naphthalic dianhydride etc.);
3,3',4,4'-biphenylsulphonictetracarboxylic dianhydride;
3,3',4,4'-biphenylethertetracarboxylic dianhydride;
3,3',4,4'-dimethyldiphenylsilane tetracarboxylic dianhydride;
4,4'-bis(3,4-dicarboxyphenoxy)diphenylsulfide dianhydride;
4,4'-bis(3,4-dicarboxyphenoxy)diphenylsulphone dianhydride;
4,4'-bis(3,4-dicarboxyphenoxy)diphenylpropane dianhydride;
3,3',4,4'-perfluoropyridenediphthalic dianhydride;
3,3',4,4'-biphenyltetracarboxylic dianhydride;
bis(phthalic)phenylsulphineoxide dianhydride;
p-phenylene-bis(triphenylphthalic)dianhydride;
m-phenylene-bis(triphenylphthalic)dianhydride;
bis(triphenylphthalic)-4,4'-diphenylether dianhydride;
bis(triphenylphthalic)-4,4'-diphenylmethane dianhydride;
2,2'-Bis-(3,4-Dicarboxyphenyl)hexafluoro-propane dianhydride;
4,4'-oxydiphthalic anhydride;
pyromellitic dianhydride;
3,3',4,4'-Diphenylsulfone tetracarboxylic dianhydride;
4',4'-Bisphenol A Dianhydride;
Hydroquinnone diphthalic anhydride;
Ethylene glycol bis trimellitic anhydride;
6,6'-bis(3,4-dicarboxyphenoxy)-2,2',3,3'-tetrahydro-3,3,3',3'-tetramethyl-1,1'-spirobi[1H-indene]dianhydride;
7,7'-bis(3,4-dicarboxyphenoxy)-3,3',4,4'-tetrahydro-4,4,4',4'-tetramethyl-2,2'-spirobi[2H-1-benzopyran]dianhydride;
1,1'-bis[1-(3,4-dicarboxyphenoxy)-2-methyl-4-phenyl]cyclohexane dianhydride;
3,3',4,4'-Diphenylsulfone tetracarboxylic dianhydride;
3,3',4,4'-Diphenylsulfide tetracarboxylic dianhydride;
3,3',4,4'-Diphenylsulfoxide tetracarboxylic dianhydride;
4,4'-Oxydiphthalic anhydride;
3,3'-benzophenone tetracarboxylic dianhydride;
4,4'-Carbonyldiphthalic anhydride;
3,3',4,4'-Diphenylmethane tetracarboxylic dianhydride;
2,2-bis(4-(3,3-dicarboxyphenyl)propane dianhydride;
2,2-bis(4-(3,3-dicarboxyphenyl)hexafluoropropane dianhydride;
(3,3',4,4'-diphenyl)phenylphosphine tetracarboxylic dianhydride;
(3,3',4,4'-diphenyl)phenylphosphineoxide tetracarboxylic dianhydride;
2,2'-dichloro-3,3',4,4'-biphenyltetracarboxylic dianhydride;
2,2'-dimethyl-3,3',4,4'-biphenyltetracarboxylic dianhydride;
2,2'-dicyano-3,3',4,4'-biphenyltetracarboxylic dianhydride;
2,2'-dibromo-3,3',4,4'-biphenyltetracarboxylic dianhydride;
2,2'-diiodo-3,3',4,4'-biphenyltetracarboxylic dianhydride;
2,2'-ditrifluoromethyl-3,3',4,4'-biphenyltetracarboxylic dianhydride;
2,2'-bis(1-methyl-4-phenyl)-3,3',4,4'-biphenyltetracarboxylic dianhydride;
2,2'-bis(1-trifluoromethyl-2-phenyl)-3,3',4,4'-biphenyltetracarboxylic dianhydride;
2,2'-bis(1-trifluoromethyl-3-phenyl)-3,3',4,4'-biphenyltetracarboxylic dianhydride;
2,2'-bis(1-trifluoromethyl-4-phenyl)-3,3',4,4'-biphenyltetracarboxylic dianhydride;
2,2'-bis(1-phenyl-4-phenyl)-3,3',4,4'-biphenyltetracarboxylic dianhydride; and,
2,2'-bis(1,3-trifluoromethyl-4-phenyl)-3,3',4,4'-biphenyltetracarboxylic dianhydride,
5,5'-[[1,1'-biphenyl]-4,4'-diylbis(oxy)]bis[1,3-isobenzofurandione] (also called 4,4'-bis(3,4-dicarboxyphenoxy) biphenyl dianhydride).

as well as isomers and mixtures comprising at least one of the foregoing.

The bis(ether anhydride)s can be prepared by the hydrolysis, followed by dehydration, of the reaction product of a nitro substituted phenyl dinitrile with a metal salt of a bisphenol compound (e.g., BPA) in the presence of a dipolar, aprotic solvent. An exemplary class of aromatic bis(ether anhydride)s included by formula (15) above includes, but is not limited to, compounds wherein T is of the formula (10):

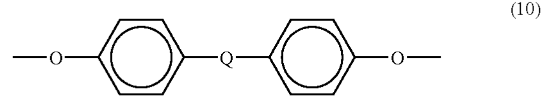

(10)

and the ether linkages, for example, are in the 3,3', 3,4', 4,3', or 4,4' positions, and mixtures comprising at least one of the foregoing, and where Q is as defined above.

Any diamino compound may be employed. Examples of suitable compounds are: ethylenediamine; propylenediamine; trimethylenediamine; diethylenetriamine; triethylenetetramine; hexamethylenediamine; heptamethylenediamine; octamethylenediamine; nonamethylenediamine; decamethylenediamine; 1,12-dodecanediamine; 1,18-octadecanediamine; 3-methylheptamethylenediamine; 4,4-dimethylheptamethylenediamine; 4-methylnonamethylenediamine; 5-methylnonamethylenediamine; 2,5-dimethylhexamethylenediamine; 2,5-dimethylheptamethylenediamine; 2,2-dimethylpropylenediamine; N-methyl-bis(3-aminopropyl) amine; 3-methoxyhexamethylenediamine; 1,2-bis(3-aminopropoxy)ethane; bis(3-aminopropyl) sulfide; 1,4-cyclohexanediamine; bis-(4-aminocyclohexyl)methane; m-phenylenediamine; p-phenylenediamine; 2,4-diaminotoluene; 2,6-diaminotoluene; m-xylylenediamine; p-xylylenediamine; 2-methyl-4,6-diethyl-1,3-phenylene-diamine; 5-methyl-4,6-diethyl-1,3-phenylene-diamine; benzidine; 3,3'-dimethylbenzidine; 3,3'-dimethoxybenzidine; 1,5-diaminonaphthalene; bis(4-aminophenyl)methane; bis(2-chloro-4-amino-3,5-diethylphenyl)methane; bis(4-aminophenyl) propane; 2,4-bis(b-amino-t-butyl) toluene; bis (p-b-amino-t-butylphenyl)ether; bis(p-b-methyl-o-aminophenyl)benzene, bis(p-b-methyl-o-aminopentyl)benzene, 1,3-diamino-4-isopropylbenzene, bis(4-aminophenyl) sulfide, bis(4-aminophenyl) sulfone, bis(4-aminophenyl)ether, and, 1,3-bis(3-aminopropyl)tetramethyldisiloxane;

4,4'-diaminodiphenylpropane; 4,4'-diaminodiphenylmethane (4,4'-methylenedianiline);

4,4'-diaminodiphenyl sulfide; 4,4'-diaminodiphenyl sulfone; 4,4'-diaminodiphenyl ether (4,4'-oxydianiline); 1,5-diaminonaphthalene; 3,3'dimethylbenzidine; 3-methylhaptamethylenediamine; 4,4-dimethylhaptamethylenediamine;

2,11-dodecanediamine; octamethylenediamine; bis(3-aminopropyl)tetramethyldisiloxane;

bis(4-aminobutyl)tetramethyldisiloxane; bis(p-amino-t-butylphenyl)ether; bis(p-methyl-o-aminophenyl)benzene; bis(p-methyl-o-aminopentyl)benzene; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzopyran]-7,7'-diamine; and, 1,1'-bis[1-amino-2-methyl-4-phenyl]cyclohexane; toluene-diamine; 1,3-bis(4-aminophenoxy)benzene; 1,3-bis(3-aminophenoxy)benzene; and all isomers thereof as well as mixtures and blends comprising at least one of the foregoing.

In one embodiment, the polyetherimide resin comprises structural units according to formula 6 wherein each R is independently p-phenylene or m-phenylene or a mixture comprising at least one of the foregoing and T is a divalent radical of the formula (11)

(11)

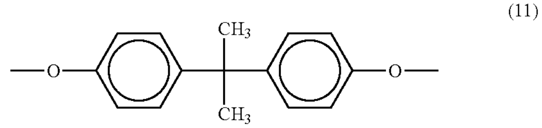

Included among the many methods of making the polyimides, particularly polyetherimides, are those disclosed in U.S. Pat. Nos. 3,847,867; 3,850,885; 3,852,242; 3,855,178; 3,983,093; and, 4,443,591.

The reactions can be carried out employing solvents, e.g., o-dichlorobenzene, m-cresol/toluene and the like, to effect a reaction between the anhydride of formula (8) and the diamine of formula (9), at temperatures of about 100° C. to about 250° C. Alternatively, the polyetherimide can be prepared by melt polymerization of aromatic bis(ether anhydride)s (8) and diamines (9) by heating a mixture of the starting materials to elevated temperatures with concurrent stirring. Generally, melt polymerizations employ temperatures of about 200° C. to about 400° C. Chain stoppers and branching agents may also be employed in the reaction.

When polyetherimide/polyimide copolymers are employed, a dianhydride, such as pyromellitic anhydride, is used in combination with the bis(ether anhydride). The polyetherimide resins can optionally be prepared from reaction of an aromatic bis(ether anhydride) with an organic diamine in which the diamine is present in the reaction mixture at less than or equal to about 0.2 molar excess. Under such conditions the polyetherimide resin may have less than or equal to about 15 microequivalents per gram (μeq/g) acid titratable groups, or, more specifically less than or equal about 10 μeq/g acid titratable groups, as shown by titration with chloroform solution with a solution of 33 weight percent (wt %) hydrobromic acid in glacial acetic acid. Acid-titratable groups are essentially due to amine end-groups in the polyetherimide resin.

One route for the synthesis of polyetherimides proceeds through a bis(4-halophthalimide) having the following structure (12):

(12)

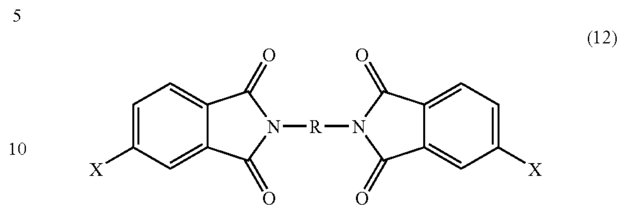

wherein R is as described above and X is a halogen. The bis(4-halophthalimide) wherein R is a 1,3-phenyl group (13) is particularly useful.

(13)

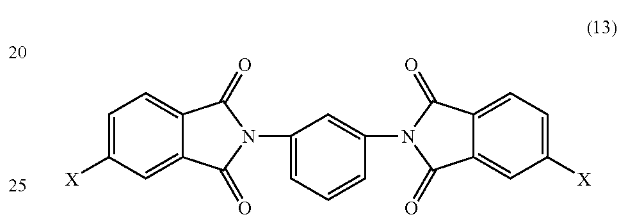

Bis(halophthalimide)s (12) and (13) are typically formed by the condensation of amines, e.g., 1,3-diaminobenzene with anhydrides, e.g., 4-halophthalic anhydride (14):

(14)

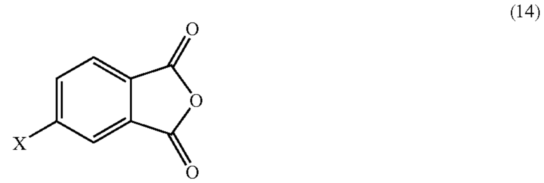

Polyetherimides may be synthesized by the reaction of the bis(halophthalimide) with an alkali metal salt of a bisphenol such as bisphenol A or a combination of an alkali metal salt of a bisphenol and an alkali metal salt of another dihydroxy substituted aromatic hydrocarbon in the presence or absence of phase transfer catalyst. Suitable phase transfer catalysts are disclosed in U.S. Pat. No. 5,229,482. Suitable dihydroxy substituted aromatic hydrocarbons include those having the formula (15)

$$OH\text{-}A^2\text{-}OH \quad (15)$$

wherein $A^2$ is a divalent aromatic hydrocarbon radical. Suitable $A^2$ radicals include m-phenylene, p-phenylene, 4,4'-biphenylene, and similar radicals.

Representative polyetherimides are those produced under the ULTEM® trademark, including, but not limited to ULTEM® 1000 (number average molecular weight (Mn) 21,000 g/mole; Mw 54,000 g/mole; dispersity 2.5), ULTEM® 1010 (Mn 19,000 gmole; Mw 47,000 g/mole; dispersity 2.5) and ULTEM 9011 (Mn 19,000 g/mole; Mw 47,000 g/mole; dispersity 2.5) resin by GE plastics, Pittsfield, Mass., in the United States of America. ULTEM type polyetherimides are described in detail in U.S. Pat. Nos. 3,847,867; 4,650,850; 4,794,157; 4,855,391; 4820,781; and, 4,816,527, which are herein incorporated by reference in their entirety as though set forth in full.

The polyetherimide resin can have a weight average molecular weight (Mw) of about 1,000 to about 1,000,000 grams per mole (g/mole), in another embodiment a Mw of about 5,000 g/mole to about 500,000 g/mole, and yet in another embodiment from about 10,000 g/mole to about 75,000 g/mole as measured by gel permeation chromatography, using a polystyrene standard.

Viscosity data for polyetherimides useful as fibers according to the present invention is calculated according to the equation: melt flow index (MFI)×10=melt flow rate (MFR) according to ASTM D1238 (volume August 2001) with the test run at 337° and 6.6 kgf. Some of that melt flow rate is provided below:

Ultem 9011: MFR 16-20 g/10 min
Ultem 1040: MFR 50-111 g/10 min
Ultem 1010: MFR 16-20 g/10 min
Ultem 1000: MFR 7-1 g/10 min As described above, the scope of the present inventions is intended to cover fibers manufactured from blends of polyimides and polyetherimides with other polymers. The skilled artisan will appreciate the number of polymers currently marketed and that any polymer can be used in association with the present invention that will meet the end use requirements for the fiber. Similarly, different polyimides and polyetherimides will have different properties and the skilled artisan will appreciate the desirability of blending one or more of the polyimides and/or polyetherimide of the present invention with another polymer to improve the fiber making or fiber properties of any polymer to be blended.

Amounts of adjunct ingredients effective to impart, or improve a desirable fiber property such as, brightness of color, strength, cleanability, flame retardance, colorfastness, or dyability. For example, one or more ingredients from the following classes of ingredients may be added to the fiber: perfume, odor control agent, antimicrobial active and/or preservative, surfactant, optical brightener, antioxidant, chelating agent including aminocarboxylate chelating agent, antistatic agent, dye transfer inhibiting agent, fabric softening active, and/or static control agent.

The final fiber produced according to the present invention can have a variety of properties depending on the individual polyetherimide, the processing conditions, and the desired end use. For example, as a general observation at the time of the filing of the present invention, and without intending to be bound in any way, as the melt index increases, the tenacity trends downward.

EXAMPLES

The following examples are included to provide additional guidance to those skilled in the art of practicing the claimed invention. These examples are provided as representative of the work and contribute to the teaching of the present invention. Accordingly, these examples are not intended to limit the scope of the present invention in any way.

A series of extrusion runs were conducted to extrude polyetherimide into fibers of approximately 1 to 8 denier per filament (dpf) at various processing conditions. The ULTEM 9011 polyetherimide resin in the form of pellets, available from GE Plastics of Pittsfield, Mass., had a number average Mw of approximately 21,000 g/mole, a melt index that ranged from approximately 1.8 to 2.2, and were dried at approximately 300° C. for about four to six hours prior to extrusion. The pellets were fed at a feed rates of 1 to 10 Kg/hr through a one inch (1") single screw extruder (L/D=24/1). The actual melt temperature of the polymers ranged between about 340° C. and about 400° C. The range of processing parameters that were used to produce polyetherimide fiber wound onto coils is summarized in Table I below.

The molten polyetherimide was extruded through the extruder die and through a metering pump, a pack top, and a filter pack before the molten polymer flowed through the spinneret which had anywhere from 128 to 144 holes to produce anywhere from 128 to 144 fibers. The molten polymer was filtered through a series of screens to remove foreign particulate matter. The screen sizes ranged from 20, 60, 100, 325, 165×800 and 200×1400 mesh, having screen hole sizes that ranged from 850, 250, 45, 25, and 15 microns, respectively, and the screens were placed in various arrangements within the screen pack. It was found that the when filter screens having a fine mesh and a screen hole size about 15 microns or less (mesh size of 200 inch×400 inch) were used alone or in combination with screens having a larger screen hole size, a buildup was produced on the face of the spinneret which indicated shear degradation of the polyetherimide polymer. When the screen was replaced with a screen having larger screen holes, the occurrence of buildup was eliminated.

The molten fibers exiting the spinneret were cooled by air having a constant velocity that was adjusted between 0.1 meters/second to 10 meters/second. The cooling air temperatures, or quench temperatures, ranged from approximately 10° C. to 16° C. The fibers produced, which had a diameter that ranged from approximately 5 microns to 95 microns in diameter, were tested for tenacity and elongation at break according to the same ASTM-02256-97 test method. The tenacity measured from approximately 1 to 3.5 g/denier. The elongation at break measured from approximately 10% to 30%. The draw ratio ranged from 0% to 100% and the measured elongation at break varied as a function of the draw ratio such that a relatively higher draw ratio of the fiber resulted in a relatively lower elongation at break.

TABLE I

| | | |
|---|---|---|
| Material | | Ultem 9011-100 |
| Denier per Filament (dpf) | | 4-10 |
| Spinneret hole diameter | | 0.45-1.0 mm |
| Holes/spinneret | | 128-144 |
| Output rate | | 100-1200 meters/min |
| Extruder | Pressure | 1600 psi |
| | Zone 1 | 340-360° C. |
| | Zone 2 | 350-370° C. |
| | Zone 3 | 370-390° C. |
| | Head T | 380-400° C. |
| | Melt T | 380-400° C. |
| R&L Melt Pumps | | 6 rpm |
| Head Pressure | | 200-1000 psi |
| Quench T | | 10-16° C. |
| Quench Velocity | | 0.1-10 m/sec |
| Room T | | 16-26 |
| Roll T1 | | 100-120° C. |
| Roll Speed 1 | | 400-500 rpm |
| Roll T2 | | 80-120° C. |
| Roll Speed 2 | | 400-1000 rpm |
| Roll T3 | | 80-120° C. |
| Roll Speed 3 | | 400-1000 rpm |
| Roll T4 | | 60-80° C. |
| Roll Speed 4 | | 400-1000 rpm |
| Draw Ratio | | 0-100% |

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All aforementioned patents and patent applications are herein incorporated by reference in their entirety as though set forth in full.

The invention claimed is:

1. A process for making polymer fiber, the process comprising:

melting a polymer consisting of polyetherimide to a melt temperature that ranges from about 180° C. to about 500° C., to produce a molten polyetherimide;

passing the molten polyetherimide through a filter with at least one filter screen wherein each of the at least one filter screen has holes greater than about 25 microns;

passing the filtered molten polyetherimide through a spinneret comprising a plurality of hole openings to produce a fiber bundle, wherein the filtered molten polymer is substantially free of foreign particulate matter having a size greater than about 25 μm in size and greater than or equal to 50% of the diameter of the fiber; and cooling the fiber bundle with a gaseous cooling medium, the cooling medium having a temperature that ranges from about 0° C. to about 80° C. and a substantially uniform velocity distribution, to produce fiber.

2. The process of claim 1, further comprising filtering the polyetherimide prior to melting the polymer.

3. The process of claim 1, wherein the polymer is melted in an extruder and passed through the hole openings of the spinneret by the extruder.

4. The process of claim 1, wherein the polymer is amorphous.

5. The process of claim 1 wherein the cooling medium has a substantially uniform velocity as it is directed toward the fiber bundle emerging from the spinneret.

6. The process of claim 1, wherein the velocity of gaseous cooling media directed toward the fiber bundle ranges from about 0.01 to about 10 meters per second.

7. The process of claim 1 wherein the gas is air.

8. The process of claim 1, wherein the melt index of the polyetherimide ranges from about 1.5 to about 2.5.

9. The process of claim 1, wherein the fiber output rate ranges from about 100 meters per minute to about 5000 meters/minute.

10. The process of claim 1, wherein the gaseous cooling medium flowing through the fiber bundle has a temperature that ranges from about 0° C. to about 40° C.

11. The process of claim 1, wherein the gaseous cooling medium flowing through the fiber bundle has a temperature that ranges from about 10° C. to about 24° C.

12. The process of claim 1, wherein the polymer is a polyetherimide which is formed from a dianhydride monomer selected from the group consisting of BPADA, ODPA, BPA and BP and a diamine selected from the group consisting of mPD, pPD, DDS and ODA.

13. The process of claim 1, wherein the diameter of the fibers can range from about 0.00001 millimeter to about 2 millimeters.

14. The process of claim 1, wherein the fiber has a tenacity of at least about 0.5.g/denier or greater according to ASTM 2256-97.

15. The process of claim 1, wherein the fiber has an elongation at break of at least 10% according to ASTM-02256-97.

16. The process of claim 1, wherein the fiber has an elongation at break of at least 20% according to ASTM-02256-97.

17. The process of claim 1, wherein the fiber has an elongation at break of at least 30% according to ASTM-02256-97.

18. The process of claim 1, wherein the pressure exerted by the polymer on the spinneret is substantially uniform across the inside surface of the spinneret.

19. The process of claim 1, wherein the number of holes in the spinneret ranges from about 20 to about 1000.

* * * * *